United States Patent [19]

Carrell et al.

[11] 3,815,455

[45] June 11, 1974

[54] CUT-OFF APPARATUS FOR PIPE MACHINE

[75] Inventors: Herbert Daniel Carrell; Adrianus Marinus Nyssen, 114 Windsor St., both of Chilliwack, British Columbia, Canada

[73] Assignee: said Nyssen, by said Carrell

[22] Filed: Oct. 5, 1972

[21] Appl. No.: 295,172

[52] U.S. Cl................ 82/53.1, 83/291, 83/318
[51] Int. Cl................ B23d 25/16, B26d 1/56
[58] Field of Search........... 83/290, 291, 318, 319; 82/53.1

[56] References Cited
UNITED STATES PATENTS

| | | | |
|---|---|---|---|
| 1,413,191 | 4/1922 | Roland | 83/291 X |
| 3,373,642 | 3/1968 | Simpson | 83/319 X |
| 3,410,164 | 11/1968 | Schluter | 83/290 |

*Primary Examiner*—Willie G. Abercrombie
*Attorney, Agent, or Firm*—Carver and Company

[57] ABSTRACT

Cut off apparatus to cut continuously advancing pipe. Cut-off carriage carrying cut-off saw is fed in direction of advancement of pipe, by pneumatic feed cylinder, at speed equal to speed of pipe advancement. Acutation of pneumatic cylinder is restricted by hydraulic retarding cylinder secured to carriage, double-acting piston dividing retarding cylinder into two cylinder spaces. Conduit having fluid metering valve connects the two cylinder spaces so that actuation of feed cylinder moves hydraulic retarding cylinder relative to piston. Piston displaces fluid through conduit and metering valve, metering valve restricting flow and thus actuation of air cylinder. Automatic cut-off sequence controlled by limit switch connected to feed cylinder. Switch is actuated by pipe when pipe is at desired length. Air cylinder actuated by limit switches cooperates with saw, moving saw into and out of engagement with pipe, whilst the carriage is maintained at the same speed as pipe.

13 Claims, 8 Drawing Figures

CUT-OFF APPARATUS FOR PIPE MACHINE

BACKGROUND OF THE INVENTION

1. Field of the Invention

The invention relates to a cut-off apparatus adapted to cut continuously advancing formed material, being particularly adapted for, but not limited to, cutting advancing and rotating pipe produced in a pipe forming machine which helically winds and seams strip material.

2. Prior Art

Machines to produce essentially continuous lengths of spirally wound pipe have been available for many years, and it is common to cut the pipe into convenient lengths whilst the pipe is advancing axially from the machine. A cut-off saw is often used, the saw being mounted so as to be fed in a direction parallel to axial advancement of the pipe at a feed speed equal to output speed of the pipe. This introduces problems of synchronizing the axial feed speed of the saw with output speed of the pipe. Pipe is generally produced from strip material of standard width, fed into the machine at a constant speed. A change in diameter of the finished pipe produces a change in helix angle of the seam, which changes output speed of the pipe from the machine.

In some prior art machines synchronization has been controlled on a time basis in which timers actuated by limit switches initiate feed of the saw at a preselected feed speed in the direction of advancement of the pipe, the saw being fed simultaneously into the pipe for cutting purposes. In such machines, a change in pipe diameter necessitates adjustment of timing devices to compensate for change in output speed, usually by trial and error, and problems associated with adjustments of this kind are well known in the trade. Such timing devices are complex and require specialized knowledge for servicing.

SUMMARY OF THE INVENTION

The invention reduces difficulties of prior art cut-off apparatus by providing a feed synchronizing means that uses a fluid metering valve to serve as a constant retarding brake on feed of a cut-off saw carriage. Timing devices are eliminated and a change in output speed of formed material is easily accommodated by adjustment of the metering valve.

In a cut-off apparatus according to the invention for cutting axially advancing formed material, a cut-off saw carriage is constrained to motion in a direction parallel to output direction of the formed material. A fluid means feeds the carriage at a feed speed synchronized with output speed of the formed material and a cut-off saw mounted on the carriage is adapted to cut the formed material when the feed speed equals the output speed.

The fluid means includes a pneumatic cylinder extending between the carriage and a stationary portion of the apparatus, so that extension of the cylinder moves the carriage. A hydraulic retarding cylinder cooperates with the carriage and the stationary portion, a double-acting piston within the hydraulic cylinder dividing the cylinder into first and second cylinder spaces containing hydraulic fluid. A conduit extends between the first and second cylinder spaces and movement of the carriage forces fluid through the conduit from one cylinder space to the other. A metering valve in the conduit is adjusted so as to restrict flow of the fluid through the conduit to serve as a brake of feed of the carriage.

A detailed description following related to drawings gives examplification of preferred embodiment of the invention which, however, is capable of expression in means other than those particularly described and illustrated.

DETAILED DISCLOSURE

Figures 1, 2, 3, 4:
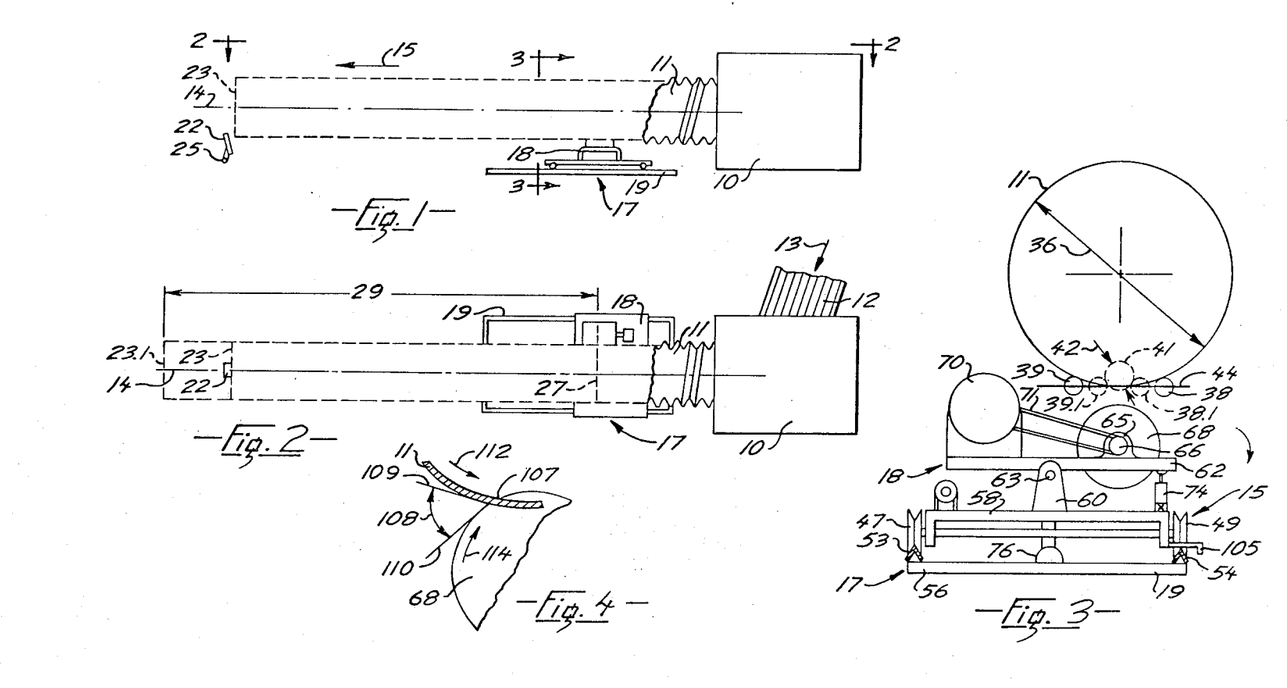
FIG. 1 is a diagrammatic side elevation of a pipe forming apparatus and cut-off apparatus, a cut-off saw carriage being shown prior to commencing a cut-off sequence.
FIG. 2 is a diagrammatic top plan view as seen from 2—2 of FIG. 1.
FIG. 3 is a simplified section on 3—3 of FIG. 1 showing the cut-off saw carriage, some parts being removed.
FIG. 4 is a fragmented detail section of a portion of the saw cutting the pipe.

FIGS. 1 AND 2

A pipe forming machine 10 produces a pipe 11 from a length of sheet material 12 fed into the machine in the direction of an arrow 13. The pipe 11 has a longitudinal axis 14 and advances axially from the machine at an output speed and in an output direction designated by an arrow 15, the pipe rotating as it advances. Hereinafter the term "output speed" refers to velocity measured along the axis, components of angular velocity about the axis being ignored. The sheet material 12 has been previously corrugated by a corrugating machine (not shown), the corrugating machine and pipe forming machine 10 are well known and form no part of the invention. For a non-corrugated pipe, the corrugating machine is eliminated.

A cut-off apparatus 17 has a cut-off saw carriage 18 mounted on a frame 19, the frame constraining the carriage to direction of motion in a line parallel to the output direction of the pipe 11 from the machine 10, i.e., parallel to the axis 14. The carriage 18 is shown in a position prior to commencement of a cut-off sequence, which sequence is triggered by a leading end 23 (broken outline) of the pipe. The cut-off apparatus has a cut-off saw (see FIGS. 3 and 5) adapted to cut the pipe to a desired length, the length being determined by a position of a paddle 22 relative to the saw. The paddle 22 is mounted on an outfeed table (not shown) so that when it is in a raised position it is hit by the leading end 23 (broken outline) of the pipe, and as the pipe passes over the paddle the paddle is held in a lowered position. The paddle 22 is connected to a first electrical limit switch, a normally-open limit switch 25, the switch being open when the paddle is raised. The paddle is maintained raised by a spring (not shown) until contacted by the pipe, at which time the paddle is pushed to the lowered position and the switch is closed, so as to conduct current, thus generating the first signal. When the paddle 22 is contacted and the limit switch closed, the cut-off sequence commences as will be described. Initially the carriage 18 starts to move by means to be described with reference to FIG. 5, and the saw moves into a position to cut the pipe when speed of the carriage equals the output speed of the pipe. There is a time lag between closing of the switch 25 and commencement of cutting of the cut-off saw, so that when the saw starts cutting at a position 27 (broken line in FIG. 2 only) on the pipe, the leading end 23 has progressed to a new position 23.1. Thus, length of pipe produced is a distance 29 between the position 27 and the new position 23.1 of the end of the pipe. In a pipe forming machine at least one complete revolution of the pipe is required to sever the pipe with the saw. Thus, to complete a cut the carriage travels a distance sufficient for a complete revolution of the pipe. The paddle 22 and limit switch 25 are portions of a length responsive means adapted to be actuated by the leading end as it advances from the machine.

FIG. 3

The pipe 11 is a pipe of maximum diameter 36, weight of pipe being supported on a pair of parallel spaced rollers 38 and 39, the rollers being permitted to free-wheel to accommodate rotation of the pipe 11 as it advances from the forming machine 10. The machine 10 is adjustable to form pipes having a range of pipe diameters, a pipe 41 having a minimum diameter 42 being shown in broken outline. To support the smaller pipe, the rollers 38 and 39 are moved inward along a horizontal axis 44 to inner positions 38.1 and 39.1 (broken outline) so a lowest portion of circumference of the pipe 41 is supported in a position relative to the axis 44 essentially unchanged from a lowest portion of the pipe 11. Spacing between the rollers 38 and 39 is thus adjustable along the axis 44 and when a change in pipe diameter is required, the rollers are repositioned by trial and error so as to support the pipe before it is cut. Means for adjusting spacing of the rollers are not shown.

Figure 5:
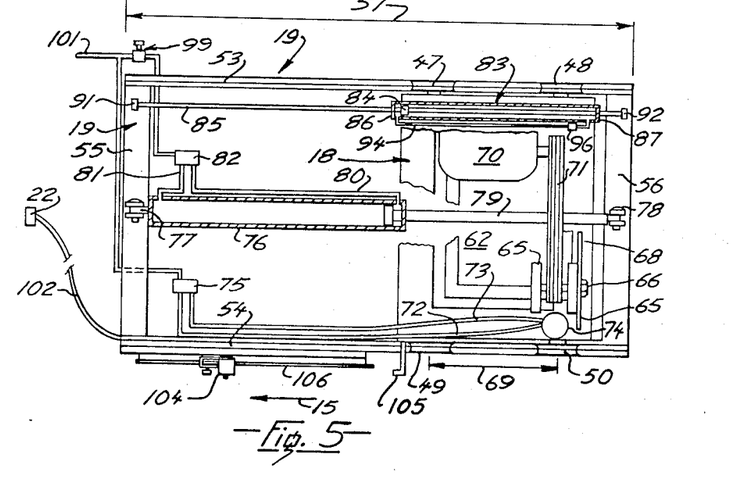
FIG. 5 is a fragmented detail top plan of 5—5 of FIG. 3, showing the cut-off saw carriage, some parts being removed.

FIGS. 3 AND 5

The carriage 18 of the cut-off apparatus 17 has four grooved wheels 47 through 50 (FIG. 5 only), the wheels 47 and 48 being aligned with each other and running on an inverted V-section rail 53, and the wheels 49 and 50 being aligned with each other and running on a similar rail 54, the rail 54 being parallel to and spaced from the rail 53. The rails 53 and 54 have equal lengths 57 and are secured by spaced transverse members 55 and 56 and make up the frame 19. The rails and wheels constrain motion of the carriage 18 to motion in the direction 15 parallel to output direction of the pipe from the machine 10. The carriage has a generally hroizontal frame 58 which carries axles for the wheels 47 through 50 and also provides a fulcrum mounting 60 (FIG. 3 only) for a cut-off arm 62, the arm 62 being journalled at a fulcrum 63 on the mounting 60. One side of the fulcrum carries a bearing block 65 which journals a saw spindle 66 carrying at one end a cut-off saw 68. An electric motor 70 is provided on the arm 62 on an opposite side of the fulcrum 63 and through belts 71 powers the saw 68. Spacing of the motor and saw from the fulcrum is adjusted so that relatively light weight of the saw counter-balances the heavier weight of the motor. Exact balance is not desirable but some compensation of the weights of the saw and motor is attained so that with the arm unsupported the side carrying the saw is the heavier side and the arm would rotate clockwise as seen in FIG. 3, thus withdrawing the saw from the cut. As stated exact balance is not attained but a force required to rotate the saw anticlockwise about the fulcrum is relatively light. Should air pressure fail whilst the saw is cutting, the saw is automatically withdrawn from the cut.

A saw actuating cylinder 74 (best seen in FIG. 3) extends between the arm 62 and the frame 58, so that actuation of the cylinder rotates the arm 62 about the fulcrum 63 and moves the saw 68 upwards into, or downwards away from, the pipe. The cylinder 74 is a standard pneumatic cylinder and is fed with air through hoses 72 and 73 from an air valve 75 (FIG. 5), hereinafter termed saw valve, associated with a circuit to be described with reference to FIG. 6. The cylinder 74 and the cut-off arm journalled on the fulcrum, thus serve as cut-off saw actuation means.

A carriage-feed cylinder 76, best seen in FIG. 5, has one end 77 hinged to the transverse member 55, and an outer end 78 of a ram 79 hinged to a portion of the frame 58, and has a stroke approximately equal to one half of the length 57 of the rail 53. Thus the cylinder 76 extends between the carriage and a stationary portion of the apparatus, the carriage having a length 69 between centers of the wheels 49 and 50 less than the stroke of the cylinder 76 so that actuation of the cylinder 76 moves the carriage from one end of the rail to the other.

In pipe forming machines, because the pipe rotates during forming, the length 57 is greater than axial movement of a point on the surface of the pipe during one complete revolution of the pipe. If the cut-off saw is to be used in other types of forming machines, such as an extrusion machine, formed material advancing from such a machine does not rotate, and the length 57 is not governed by this parameter but is governed by the time required to sever a portion of the formed material, as explained later.

When the ram 79 is fully extended from the cylinder 76 the carriage 18 is at one end of the rails, and when the ram is retracted the carriage is at an opposite end of the rails. The feed cylinder 76 is a standard extensible and retractable pneumatic cylinder and is fed with air at a pressure of about 60 psi through the hoses 80 an 81 from an air valve 82, hereinafter feed valve, associated with circuit to be described with reference to FIG. 6, the air pressure being regulated by a regulator 99.

A hydraulic retarding cylinder 83 is secured to the carriage 18 and is axially aligned with the cylinder 76. The cylinder 83 has a double-acting piston 84 secured to a piston rod 85, which rod passes through ends 86 and 87 of the cylinder, the piston rod having ends 91 and 92 secured to the transverse members 55 and 56 respectively. The piston 84 is mounted for an approximate mid-position of the rod 85 and, as seen in FIG. 5, when the carriage is at right hand end of the rails the piston 84 is adjacent the end 86 of the cylinder. Movement of the carriage in a direction of the arrow 15 causes the cylinder 83 to move relative to the piston 84 so that when the carriage 18 approaches the left hand end of the rails, i.e., limit of movement, the piston 84 is adjacent the end 87. The piston 84 divides the cylinder 83 into first and second cylinder spaces, and undesignated ports adjacent the ends 86 and 87 are provided so that at limits of the stroke the ports are clear of the piston. A pipe 94 serving as a conduit extends on the outside of the cylinder 83 and connects the ports so that when both cylinder spaces contain hydraulic fluid, movement of the carriage from one end of the rail to an opposite end of the rail displaces fluid from one cylinder space, through the pipe 94, into the other cylinder space. An adjustable metering valve 96 is provided in the pipe 94 and, by a tapered needle valve or other metering means controls volume flow of fluid through pipe 94. The valve 96 restricts flow of fluid along the pipe 94, and increasing closure of the valve increases resistance which is sufficient to limit speed of the carriage as it traverses the rails due to actuation of the cylinder 76. Note that the cylinder 83 and associate pipe 94 form a closed loop hydraulic circuit and once initially filled with hydraulic fluid, provided there is no leakage, do not require a hydraulic pump or sump. Thus the closed hydraulic circuit is independent of pump feeds, or fluid levels, and, for a given fluid viscosity and metering valve setting, and with a normal range of air pressures fed to the cylinder 76, feed speed of the carriage is governed by resistance to flow of the fluid through the valve.

As is well known, an unrestricted pneumatic cylinder is actuated i.e. extends or retracts, when static friction between the moving parts is overcome by force arising from air pressure acting on the piston. There is a variation in friction throughout the stroke of the cylinder, and thus there is a variation in air pressure required to move the piston. As is also well known in the trade, actuation of the cylinders is sudden and is difficult to control by varying air pressure. If the hydraulic retarding cylinder 83 were eliminated and the carriage were to be moved solely by the air cylinder 76, the carriage 18 would be jerked from one end of the rails to the other and the feeding of the carriage would be erratic and difficult to control using air pressure alone.

A central concept of the invention is to use hydraulic fluid metering to provide an essentially constant retarding force on the carriage and eliminate erratic feed arising from the cylinder 76. Adjustment of the retarding force permits easy control of the feed speed of the carriage. Air at about 60 psi. is supplied to actuate the feed cylinder 76 and the carriage starts to move, hydraulic fluid in the cylinder 83 being displaced by the piston producing a flow of fluid through the pipe 94 between the first and second cylinder spaces. The valve 96 restricts the flow between the cylinder spaces which flow attains a maximum and applies an essentially constant retarding force on the carriage. The constant retarding force resists the force of the feed cylinder and retards actuation of the feed cylinder, thus maintaining an essentially constant carriage speed dependent on retarding force. By adjustment of the metering valve, the retarding force is adjusted and the feed speed of the carriage can be accurately controlled, and by trial and error can be adjusted to that of the output speed of the pipe advancing from the machine. Thus the air cylinder 76 serves as an extensible and retractable pneumatic feed means cooperating with the carriage to move the carriage in the output direction. The hydraulic cylinder 83 and the metering valve 96 in the pipe 94 serve as a hydraulic retarding means cooperating with the carriage, the hydraulic retarding means having spaces containing hydraulic fluid, and having means to displace the fluid in response to movement of the carriage, and means to restrict displacement of the fluid between the spaces. The restriction produces a retarding force on the carriage to retard movement of the carriage due to the pneumatic feed means to a feed speed synchronized with the output speed of the pipe.

The valves 75 and 82 are electrically operated air valves, and are actuated by the limit switch 25 associated with the paddle 22 on the kickoff table (see FIG. 2), which switch is connected to the valves through an electrical line 102. A second electrical limit switch, a normally closed limit switch 104, is mounted on a rod 106 aligned with feed of the carriage, which switch is actuated to remove the saw from the pipe after severing of the pipe, to be explained. The switch 104 is positioned as shown in FIG. 5, so that an operator 105 secured to the carriage 18 contacts the limit switch 104 as the carriage approaches the end of a feedstroke in the direction of the arrow 15, the feed stroke being dependent on axial movement of a point on the surface of the pipe during one complete revolution of the pipe, as aforesaid. The switch 104 is slidable axially along the rod 106 so that the position of the carriage on the frame at an instant of contact with the limit switch 104 is variable. The limit switch 104 is connected by electrical lines 103 (FIG. 6) to the air valve 75 so that when the switch 104 is actuated by the carriage, a second signal is generated and fed to the valve 75 and the extended cylinder 74 is actuated, thus withdrawing the saw from the pipe after the pipe has been severed. Thus the saw is withdrawn when the carriage reaches a position on the frame 19 determined by the limit switch 104, the limit switch 104 thus serving as a cut limiting means.

For effective operation of the cut-off apparatus, it is essential that feed speed of the carriage 18 is synchronized with the output speed of advancement of the pipe from the machine 10 when the saw 68 commences cutting, and that this synchronization is maintained throughout the cutting of the saw. When the pipe is severed, the cylinder 74 is retracted so that the saw is brought out of contact with the pipe, relative speeds between the pipe and the carriage being essentially zero until the saw is withdrawn completely thus preventing interference with the saw. Clearly the carriage does not attain the desired speed as soon as it moves. There is a relatively short time lag due to acceleration of the carriage and to ensure that the carriage reaches the desired speed before the saw contacts the pipe, means to delay extension of the cylinder 74 are provided. One means to delay is to select the cylinder 74 so that it has a larger diameter than the cylinder 76. Thus for equal volumes of air received in each of the cylinders, the cylinder 76 is actuated before the cylinder 74. The cylinder 74 has a relatively short stroke, for example about 4 inches, and depth of penetration of the saw into the pipe is optimised by maintaining a particular angle of contact of the saw to the pipe, as is described with reference to FIG. 4.

FIG. 4

For efficient cutting of thick gauge pipe e.g. ten or twelve gauge, the saw contacts a periphery of the pipe at a particular angle of contact. At a point of contact 107, tangents 109 and 110 to the pipe and the saw at the point 107 are inclined to each other at an angle of contact 108, which angle is substantially constant throughout the cutting of the pipe. The angle of contact 108 is about 60°, depth of penetration of the saw into the pipe is dependent on the diameter of the pipe and is of the order of a few inches so as to maintain the angle 108 essentially constant. It has been found that life of the saw is increased by maintaining the angle 108 as steep as is practical so that number of teeth of the saw actually cutting at any instant is reduced, that is length of cut at any instant approaches a minimum dependent of gauge of material. As the pipe is produced it rotates in direction of an arrow 112 an the saw rotates in a direction of an arrow 114. During cutting there is a tendency for the saw to push the pipe to one side and upwards. For large diameter thick gauge pipes, weight of the pipe is sufficient to maintain the pipe in place during cutting. During cutting of small diameter thin gauge pipes, or short lengths of pipe previously severed by the cut-off saw and therefore free of the machine, an additional pipe restraining means is required, such as a pipe steady as described with reference to FIGS. 7 and 8.

Figure 6:
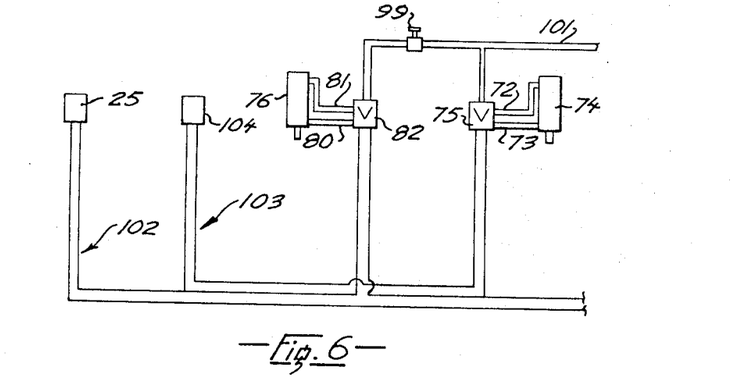
FIG. 6 is a schematic showing hydraulic, pneumatic, and electrical circuitry associated with the invention.

FIG. 6

The limit switches 25 and 104 and the electrically operated saw and feed valves 75 and 82 respectively are connected in an electrical circuit as shown schematically in FIG. 6, the circuit being a portion of an automatic means to initiate the cut-off sequence when the forming machine has produced a required length of pipe. The valves are fed with compressed air from a line 101 which feeds directly into the saw valve 75, and as before stated, through the regulator 99 which limits air pressure to about 60 psi. for air delivered to the feed valve 82. The limit switches 25 and 104 can be identical, a suitable switch being supplied by Allen Bradley and gven a part number 802T-W. The limit switch 25 is wired so as to be normally open, and the limit switch 104 is wired so as to be normally closed. A suitable air regulator is supplied by Norgren under part number 11-002-019-0-160 psi. The saw valve 75 controlling the saw actuating cylinder 74 is a normally open, two-way valve, a suitable valve being supplied by Bellows Valvair as L045-24-112. The feed valve 82 controlling the carriage - feed cylinder 76 is a normally open two-way valve, a suitable valve being supplied by Bellows Valvair under part number K065-4-033.

Outputs of the valve 82 are arranged so that when the valve is de-energized air is fed into the cylinder so as to maintain the carriage 18 at a beginning of its stroke, that is at the right hand side of the frame as seen in FIG. 5. When the valve 82 is energized, the ports are reversed and air is fed into the cylinder so as to bring the carriage to the finishing end of the stroke. Outputs of the valve 75 are arranged so that when the valve is de-energized air is fed to the cylinder 74 so as to maintain the cylinder in a retracted position, that is the saw is withdrawn from the cutting stroke as shown in FIG. 3. When the valve is energized the ports are reversed and the cylinder extends so as to feed the saw into the pipe.

Figure 7:
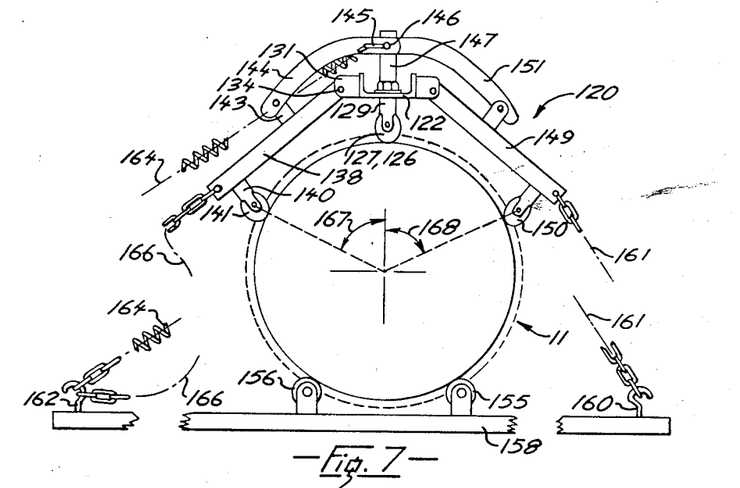
FIG. 7 is an end elevation of a device to retain the pipe during cutting.
Figure 8:
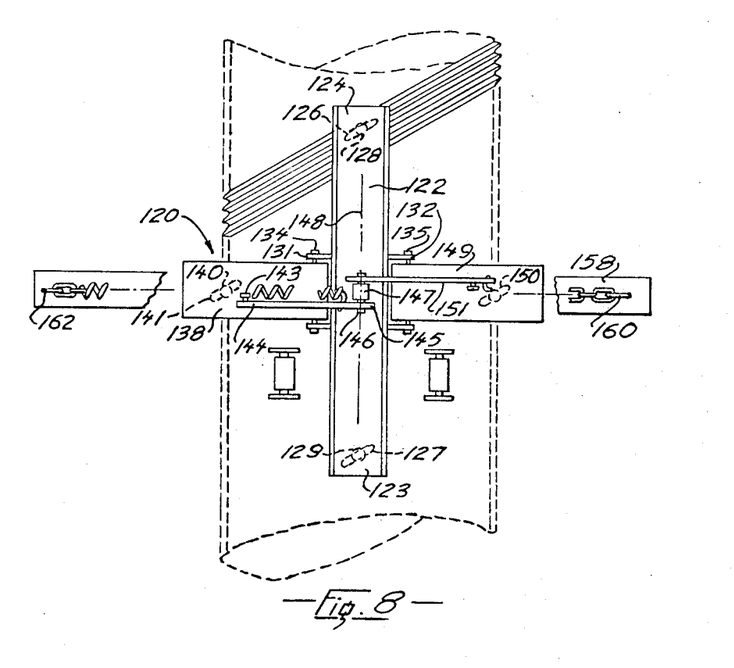
FIG. 8 is a top plan view of the device of FIG. 7.

FIGS. 7 AND 8

As previously stated, for cutting lengths of pipe that are free of the pipe forming machine, or for cutting a small diameter pipe as it advances from the machine a pipe steady is required to maintain the pipe relatively rigid whilst cutting. A steady 120 according to the invention has a central body 122, suitably of an inverted girder section as shown, having ends 123 and 124, the ends carrying rollers 126 and 127 journalled in forks 128 and 129, one fork being shown in side elevation in FIG. 8. U-shaped brackets 131 and 132 extend from an opposite side of the body 122 and provide mountings for hinge pins 134 and 135. A hinged arm 138 having an inner end and an outer end is journalled at the inner end on the pin 134, and at the outer end has a fork 140 and roller 141 similar to the fork 129 and roller 127.

An upper bracket 143 extends from an upper surface of the arm 138 and journals an outer end of a link 144, an inner end of the link 144 having a slot 145 to accept a pin 146, the pin extending outwards from a column 147 secured to and extending upwards from the body 122. The link 144 is curved as seen in FIG. 7 to prevent interference with the bracket 131, and the slot 145 at the inner end of the link 144 provides accommodation for adjustment of the arm 138 as will be described. A similar hinged arm 149 is hinged on the pin 135 and has a similar link 151, th pin 146 journalling an inner end thereof in a slot similar to te slot 145. The arm 149 has a fork and roller 150 equivalent to the fork 140 and roller 141. Thus the steady is essentially symmetrical about a longitudinal axis 148 of the body 122. With reference to FIG. 7, the steady 120 is shown in engagement with the pipe 11, in which the rollers 141 and 150 ar shown in engagement with opposite sides of the pipe, and the roller 127, together with the roller 126 (not shown in FIG. 7) in engagement with an upper most portion of the pipe. Each roller can be swivelled about a vertical axis of the fork and locked in a particular disposition relative to the steady, and as seen in FIG. 8, the rollers are aligned with the helix angle of the corrugations so as to run within troughs of the corrugations at the helix angle to reduce a tendency of the pipe to deviate from axial translation. A lower portion of the pipe is carried on a pair of spaced rollers 155 and 156 carried on a frame 158 secured to the machine, spacing between the rollers being adjustable to accommodate a change in diameter of the pipe, so that the pipe is supported as it advances from the machine, thus reducing bending of the pipe.

An anchor 160, such as a hook as shown, is secured to the frame 158 and a chain 161 extends between the anchor and an outer end of the hinged arm 149. Length of the chain is adjustable by selecting a particular link of the chain to be engaged by the hook, the length is adjusted so that the rollers 126 (FIG. 8 only) and 127 run on the uppermost portion of the pipe. A similar anchor 162 extends from an opposite side of the frame and a tension coil spring 154 extends from the anchor 162 to the slot 145 of the link 144. A portion of a second chain 166 extends in a slack state from the anchor 162 to the hinged arm 138 and is a safety chain should failure of the spring occur. Position of the anchor and length of the spring 164 is such that the spring urges the steady 120 onto the pipe locating the rollers 126 and 127 in engagement with the uppermost portion of the pipe, and maintaining the rollers 141 and 150 in engagement with lower portions. The rollers 141 and 150 are disposed relative to the rollers 126 and 127 at angles 167 and 168 as shown, the angles being suitably about 60°. Clearly, diameter of the pipe and length of the arms 138 and 149 determines actual positions of the rollers 141 and 150 and the steady 120 can be designed so as to accommodate a range of pipe diameters to be handled by the machine.

If a smooth-sided pipe, i.e., non-corrugated, were to be used in a different type of pipe-forming machine, rubber-tyred rollers (not shown) could be substituted for the rollers 126, 127, 141, and 150. Such rollers would be mounted on forks adjustable about an axis so as to be aligned with the helix angle of the seam.

OPERATION

With reference to FIGS. 1 and 2 the pipe machine 10, fed with suitable sheet material runs continuously and produces a length of pipe 11 which is advanced in direction of the arrow 15 along the axis 14. During operation of the pipe machine it is usual, but not essential to maintain the cut-off saw operating throughout. As the pipe advances, the leading end 23 is fed over the outfeed table, (not shown) until it contacts the paddle 22, thus initiating the cut-off sequence. The paddle is pushed down by th leading edge and the normally open limit switch 25 is closed, completing the circuit through the line 102 so as to actuate the feed valve 82 (FIG. 5) with the first signal. The feed valve 82 feeds air along the hose 80 to the feed cylinder 76 and the ram 79 starts to retract. Simultaneously the saw valve 75 is also actuated by the first signal and air fed through the hose 72 to the cylinder 74 starts to actuate the cylinder. The ram of the cylinder 74 starts to extend after the carriage moves due to the delay means aforesaid. The saw contacts the pipe when the carriage speed equals the output feed of the pipe from the machine, i.e., relative axial speed between the carriage and the pipe is essentially zero.

As the cylinder 74 extends, the saw contacts the pipe and commences cutting, until the angle of contact 108 (FIG. 4) is attained at which stage extension of the cylinder is limited by stop means (not shown). The pipe rotates continuously and is cut as the carriage moves alongside the pipe. When the pipe has completed at least one revolution the pipe is severed in two and the operator 105 on the carriage 18 contacts the limit switch 104, opening the switch 104 and producing the second signal. The second signal cuts current to the saw valve 75 which immediately reverses air feed into the saw cylinder 74, causing retraction of the cylinder and withdrawal of the saw from the cut. As stated, the length of travel of the carriage along the frame 19 during cutting is dependent on distance a point on the surface of the pipe travels in one revolution. This is dependent on helix angle of the pipe, width of the material 12 and diameter of the pipe produced. Position of the limit switch 104 is found by simple experiment based on an approximate routine calculation. After the saw is withdrawn the carriage continues to the end of the stroke, limited by stroke of the feed cylinder 76.

A portion of the pipe advancing from the machine has thus been cut into a separate length, and feed means on the kick-off table (not shown) now feed the separate length of pipe at a speed greater than the output feed of a remaining portion of the pipe advancing continuously from the pipe forming machine. The feed means forms no part of this and any suitable conveyor means can be used. Means are also provided on the outfeed table to move the pipe off the table, such means can be automatic kick-off means or if required the cut length of pipe can be lifted manually from the table or by gravity or other means. As soon as the length of pipe is removed from the table, the paddle 22 is spring-urged back to the raised position on the cut-off table, thus opening the limit switch 25, and cutting current to the feed valve 82. When de-energized, the valve 82 reverses air to the feed cylinder 76, thus returning the carriage to the end of the frame 19. The carriage is now ready to commence a second traverse of the frame 19, which commences when a leading end of the remaining portion of the pipe being produced by the machine contacts the paddle 22 and re-initiates the cut-off sequence.

If the pipe steady 120 is used, it is fitted over the pipes as described between the pipe forming machine and the beginning of the stroke of the cut-off saw carriage. The steady is fitted over a portion of pipe extending from the pipe forming machine, and a link of the chain 161 is fitted on the anchor 160 so that, when the chain 161 is taut the rollers 126 and 127 are on the uppermost portion of th pipe. The roller 150 is thus urged against the pipe. The arm 138 is then positioned as shown in FIG. 7 by tensioning the spring 164 on the anchor 162, thus urging the roller 141 against the pipe. The chain 166 had been previously hooked on the anchor 162 as a safety means.

We claim:

1. A cut-off apparatus for use in a forming machine adapted to produce a length of formed material having a longitudinal axis, in which the formed material is advanced axially from the machine at a constant output speed and direction, the cut-off apparatus including:
   a. a cut-off saw carriage constrained to motion in a direction parallel to the output direction of formed material; and a cut-off saw mounted on the carriage, the saw adapted to be brought into and out of engagement with the formed material,
   b. extensible and retractable pneumatic feed means cooperating with the carriage to move the carriage in the output direction,
   c. hydraulic retarding means cooperating with the carriage, the hydraulic means having spaces containing hydraulic fluid, and having means to displace the fluid in response to movement of the carriage, and means to restrict displacement of the fluid beween the spaces, such restriction producing a retarding force on the carriage to retard movement of the carriage due to the feed means to a feed speed synchronized with output speed of the formed material, so that when the formed material is being cut by the saw, relative axial speed between the carriage and the formed material is essentially zero.

2. A cut-off apparatus as claimed in claim 1 in which:
   d. the pneumatic feed means includes an extensible and retractable pneumatic carriage feed cylinder extending between the carriage and a stationary portion of the apparatus so that actuation of the cylinder moves the carriage;
   and the hydraulic retarding means includes:
   e. a hydraulic retarding cylinder cooperating with the carriage and the stationary portion of th apparatus, the cylinder having a slidable double-acting piston dividing the cylinder into first and second cylinder spaces containing hydraulic fluid; a piston rod being secured to the piston parallel to the longitudinal axis of the formed material, f. a conduit connecting the first cylinder space with the second cylinder space, so that when the pneumatic feed cylinder is actuated, the carriage starts to move and hydraulic fluid in the hydraulic retarding cylinder is displaced by the piston producing a flow of hydraulic fluid through the conduit between the first and second spaces, which flow is restricted and attains a maximum so as to apply an essentially constant retarding force on the carriage, thus retarding actuation of the pneumatic feed cylinder and maintaining an essentially constant carriage speed dependent on the retarding force.

3. A cut-off apparatus as claimed in claim 2 further including:

g. a metering valve provided in the conduit so as to control flow of hydraulic fluid between the cylinder spaces of the hydraulic retarding cylinder, so that adjustment of the metering means effects the retarding force on the carriage and thus carriage speed.

4. A cut-off apparatus as claimed in claim 1 further including:

h. automatic means to initiate a cut-off sequence when the forming machine has produced a portion of formed material of required length.

5. A cut-off apparatus as claimed in claim 4 in which the automatic means includes:

i. length responsive means spaced axially from the forming machine and adapted to be actuated by a leading end of the formed material as it advances from the machine, the length responsive means generating a first signal when actuated by the leading end of the pipe, j. cut limiting means adjacent the cut-off saw carriage adapted to be actuated by the carriage as the carriage approaches an end of a feed stroke, the cut limiting means generating a second signal after the pipe has been severed, and the cut-off saw responds to k. a cut-off saw actuation means adapted to bring the saw into contact with the formed material in response to the first signal and to bring the saw out of contact with the formed material after severing the pipe in response to the second signal.

6. A cut-off apparatus as claimed in claim 5 in which:

l. the length responsive means is a first electrical limit switch connected to a paddle, the paddle adapted to be contacted by the leading end of the pipe, m. the cut limiting means is a second electrical limit switch adapted to be contacted by an operator secured to the carriage as the carriage approaches an end of the feed stroke, and the automatic means further includes:

n. an electrically actuated feed valve connected to the first limit switch, the feed valve receiving air under pressure and adapted to selectively direct air to the pneumatic feed cylinder in response to the first signal, o. an electrically actuated saw valve connected to the first and second limit switches, the saw valve being connected to the cut-off saw actuation means so as to selectively bring the saw into and out of contact with the formed material in response to the first and second signals.

7. A cut-off apparatus as defined in claim 6 in which the cut-off saw actuation means includes:

p. a cut-off arm journalled for rotation on a fulcrum mounting, the saw mounted on the arm so that the saw can be brought into contact with, and brought out of contact with, the formed material, q. a saw-actuating cylinder extending between the arm and the carriage so that actuation of the cylinder rotates the arm, the cylinder being actuated by the saw valve so that when the first limit switch is actuated, the saw valve directs air to the saw-actuating cylinder and rotates the arm to bring the saw into contact with the formed material, and when the second limit switch is actuated the saw valve re-directs air to the saw actuating cylinder and rotates the arm to bring the saw out of contact with the formed material.

8. A cut-off apparatus as defined in claim 7 in which:

r. the cut-off saw is mounted on one side of the cut-off arm and a motor powering the saw is mounted on the opposite side of the arm, the fulcrum mounting positioned so as to attain an approximate balance of the arm, so that when th arm is unsupported, the side of the arm carrying the saw is the heavier side and the arm tends to rotate withdrawing the saw from the cut.

9. A cut-off apparatus as defined in claim 1 in which:

s. the cut-off saw carriage has four grooved wheels, the wheels being disposed in aligned pairs, and the apparatus further includes:

t. a frame having a pair of parallel spaced rails adapted to carry the grooved wheels, the rails being parallel with the axis of the formed material, so as to constrain motion of the carriage to motion in a direction parallel to output direction of the pipe from the machine.

10. A cut-off apparatus as defined in claim 1 further including a steady adapted to constrain the formed material to essentially axial motion during cutting, the steady including:

u. a central body having opposite ends, the ends having rollers journalled in forks, a column extending from the body, the column having a pin, v. a pair of hinged arms having inner and outer ends, the arms extending transversely from the body, the inner ends of the arms being journalled for rotation about the body, the outer ends having rollers journalled in forks, w. a link having inner and outer ends, a slot at the inner end to accept the pin, the outer end of the link being journalled to one hinged arm; a similar link journalled on the other hinged arm, and being similarly held at the column, the steady cooperating with a stationary portion of the apparatus including:

x. a pair of spaced rollers straddling the axis, the rollers being journalled on the stationary portion of the apparatus on a side of the formed material remote from the steady, the formed material contacting the rollers, y. a pair of spaced anchors straddling the axis of the formed material and secured to the stationary portion of the apparatus between the saw and forming machine, one anchor being connected to one link by a chain, the second anchor being connected to the second link by a spring member, so that the spring member is strained so as to urge the four rollers of the steady onto the formed material, the formed material being urged onto the pair of spaced rollers, the rollers rotating as the pipe advances so as to permit the formed material to extend through the steady whilst lateral and vertical movement is essentially restricted.

11. A cut-off apparatus as defined in claim 2 in which:
   z. the piston rod of the hydraulic retarding cylinder passes through ends of the cylinder, the rod having ends secured to portions of the frame, and
   aa. the hydraulic retarding cylinder is secured to the carriage, so that movement of the carriage causes the cylinder to move relative to the piston.

12. A cut-off apparatus as defined in claim 7 further including a delay means cooperating with the saw-actuating cylinder to delay extension of the saw-actuating cylinder relative to the carriage feed cylinder so that the carriage has attained the feed speed synchronized with the output speed of the formed material before the saw contacts the formed material.

13. A cut-off apparatus as claimed in claim 12 in which the delay means is characterized by the saw-actuating cylinder having a diameter larger than the diameter of the carriage feed cylinder so that, when equal volumes of air are received in each cylinder, the carriage feed cylinder is actuated before the saw-actuating cylinder.

* * * * *